Patented Feb. 7, 1928.

1,658,607

UNITED STATES PATENT OFFICE.

LEON LILIENFELD, OF VIENNA, AUSTRIA. REISSUED

VISCOSE AND PROCESS FOR MAKING SAME.

No Drawing. Application filed June 18, 1923, Serial No. 646,240, and in Austria March 15, 1923.
Renewed November 23, 1927.

I have made the discovery that in the manufacture of viscose the application of temperatures below 0° C., for example temperatures between 0° and −25° C., or lower, produces surprising effects which afford considerable advantages to the viscose art.

These effects are to be seen in the following directions:—

The application of cold during the sulphidizing and dissolving stages, but particularly the latter stage makes possible the production of viscose in one continuous operation. Thus, for example, it is possible without further ado to convert cellulose mixed with dilute alkali solution into a technically valuable viscose solution by treating with carbon bisulphide and subsequently cooling. By suitably conducting the process, it is even possible to combine the mixing of the cellulose with the alkali solution, the sulphidizing and the dissolving practically in one operation.

The following examples are given for this modification of the process:

(a) Mixtures of cellulose with dilute alkali solutions (for example caustic soda solution of from 4 to 12 per cent strength), which even when treated for many hours with small to moderate quantities of carbon bisulphide (for example 1/5 to 2/3 of one molecular proportion of carbon bisulphide to one molecular proportion of $C_6H_{10}O_5$) at room temperature are not dissolved or are only incompletely dissolved, but yield products which even after addition of stronger alkali solution do not dissolve or dissolve incompletely, are converted with remarkable speed into perfect viscose solutions after being subjected to the action of carbon bisulphide even for quite a short time, for instance 5 to 30 minutes, if they are subjected to the influence of low temperatures.

(b) Mixtures of cellulose with dilute alkali solutions (for example caustic soda solution of 4-8 per cent strength) which when treated for many hours even with large proportions of carbon bisulphide (for example 2/3 to 1 molecular proportion of carbon bisulphide to one molecular portion of $C_6H_{10}O_5$) at room temperature do not pass or pass only incompletely into viscose solutions, and yield only products which dissolve completely only after addition of stronger alkali solution (that is after increasing the strength of the caustic soda solution present, for example to 10–12 per cent), are converted with extraordinary rapidity into perfect viscose solutions even after quite short action of carbon bisulphide, for example for 5 to 30 minutes, if they are subjected to the influence of low temperatures.

(c) Mixtures of cellulose with alkali solutions (for example caustic soda solution of 9–12 per cent strength) which at room temperature pass into complete or nearly complete solution only after several hours treatment with large proportions of carbon bisulphide (for example 1–1½ molecular proportions of carbon bisulphide to one molecular proportion of $C_6H_{10}O_5$), are converted with great speed into perfect viscose solutions even after quite short treatment, for example for 5 to 30 minutes, with carbon bisulphide, if they are exposed to the influence of low temperatures.

(d) Alkali-cellulose which requires several hours treatment with carbon bisulphide at room temperature before it yields a product that dissolves completely at normal temperature on addition of water or alkali solution, dissolves in water or alkali solution even after quite short action (5 to 30 minutes) of the carbon bisulphide, if the solution occurs at a low temperature.

In addition to the possibility of starting from cellulose mixed with alkali solution and converting it into viscose in one continuous operation, further advantages accrue from the invention when the parent material is a true alkali cellulose, that is to say a product obtained by mixing cellulose with alkali solution of 15 to 50 per cent strength, or by impregnating cellulose with such solution, removing the excess by more or less pressure or by centrifuging or the like and, where necessary, disintegrating the residue.

The possibility of shortening the process and radically reducing the amount of carbon bisulphide, is also of benefit to the alkali cellulose. Moreover, the tendency—enhanced or developed by the cold—of the sulphidized alkali cellulose to pass into solution, permits of curtailing considerably the mercerizing and ripening operations, or even of eliminating the latter altogether, and of simplifying the disintegrating operation or of substituting for it a simple loosening operation—circumstances which considerably reduce the deleterious influence of the alkali. In addition, the application of low temperatures according to the invention to sulphidizing and dissolving or to dissolving alone, makes the solutions more perfect.

An important advantage of the invention consists in the possibility of reducing the proportion of carbon bisulphide far below that hitherto customary in viscose manufacture. For example, even about 1/40 to 1/10 of a molecular proportion of carbon bisulphide per molecular proportion of cellulose $C_6H_{10}O_5$, that is an amount of carbon bisulphide weighing from $\frac{1}{100}$ to $\frac{1}{25}$ of the cellulose used, suffices to yield technically useful viscose solutions.

When the invention is applied with the use of very small proportions of carbon bisulphide, there are obtained viscose solutions which even in the crude state are practically colourless and odourless and keep for weeks. As shown even by the very small consumption of carbon bisulphide, such viscoses exhibit a novel, high-molecular composition. They yield the characteristic reactions of viscose, such as coloration with metallic salts, the iodine reaction, and splitting off of carbon bisulphide. They are ready for use even when freshly made, that is to say they are capable of being spun and worked up into all the products that come into consideration. A further advantage is that when formed into threads, films, plates and the like they do not become milky in the precipitating baths. Their coagulability is considerable. Even dilute inorganic or organic acids alone, salt solutions, dilute alcohol solutions and the like suffice to solidify such viscoses in sheet or filament form. Accordingly, the working up of such viscoses into technical products is simple and cheap. In view of the proportions of carbon bisulphide used, such viscoses can contain only slight proportions of carbon bisulphide residues. Assuming the maximum limit for the proportions of carbon bisulphide used in the manufatcure of such viscoses poor in carbon bisulphide residue to be 1/6th molecular proportions of $CS_2$ per 1 molecular proportion of $C_6H_{10}O_5$ and the minimum to be 1/40 molecular proportion of $CS_2$ per 1 molecular proportion of $C_6H_{10}O_5$, the following theoretical limiting formulas may be given for the final products of those modifications of the invention in which such small proportions are used:—

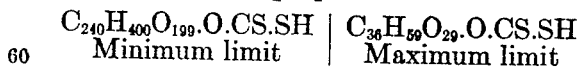

$C_{240}H_{400}O_{199}.O.CS.SH$ | $C_{36}H_{59}O_{29}.O.CS.SH$
Minimum limit | Maximum limit between which formulas every possible transition stage must be included.

The fact that according to the present process xanthate stages can be produced within the limits $C_{36}$ and $C_{240}$ is all the more surprising as the chemistry of viscose starts, as known, from the assumption that the stage $C_{36}$, which hitherto could be obtained only by decomposition of normal viscoses, forms the limit and that even the xanthate $C_{48}$ is not capable of existing, because at the moment of its formation it immediately decomposes leaving cellulose-hydrate. The results of this invention show that not only is the xanthate $C_{48}$ capable of existence, but even xanthates which contain a much smaller proportion of carbon bisulphide residues. What is still more important, however, is that they show that such xanthates are surprisingly durable and have excellent properties which render them particularly useful for technical purposes.

The fact that when very small proportions of carbon bisulphide are used the invention yields viscoses having valuable technical properties, in no wise detracts from its value when larger proportions of carbon bisulphide are used. As the latitude allowed between the maximum limit asumed above (1/6 molecular proportion of $CS_2$ to 1 molecular proportion of $C_6H_{10}O_5$) and the proportions of carbon bisulphide usually employed in the manufacture of viscose (about one molecule of $CS_2$ per one molecule of cellulose $C_6H_{10}O_5$) is very large and as, according to the invention, technically valuable viscoses are produced irrespective of the amount of carbon bisulphide employed, a sharp, quantitative limit cannot be drawn. The most valuable technical effects of the application of cold, namely a more rapid and simpler production and a thorough conservation of the cellulose and an improvement of the final viscose solution are realized in every case, so that the invention is applicable with small, medium and large proportions of carbon bisulphide.

As parent materials for the process, owing partly to its simplicity and partly to the admissibility of small amounts of carbon bisulphide, there come into consideration not only the parent materials commonly used in viscose production, but also bodies which may be obtained from cellulose by somewhat more elaborate methods. The following are given by way of example: Bleached or unbleached cellulose of every kind, cellulose containing materials, mechanically or chemically hydrated or hydrolized cellulose (for instance by grinding it with water, or by treating it with strong mineral acid in the warmth or with zinc halides in the presence or absence of acid, or with copper oxide ammonia), oxycellulose, mercerized cellulose with or without being washed and with or without being treated with a dilute acid, artificial threads produced from conversion products or derivatives of cellulose, artificial silk waste etc.

In the following part of the description and in the claims, the term "cellulose" or "parent material", wherever the meaning permits, is intended to include any of the materials enumerated in the foregoing paragraph.

Several methods of introducing the alkali to the parent material are afforded, of which the most important three will be recited:—

*Method 1.*—The parent material is converted into alkali cellulose in known manner, that is to say it is impregnated with strong alkali solution, for example caustic soda solution of 15–50 per cent strength, and the excess of the alkali solution is eliminated by pressing, centrifuging or the like, so that the residue contains, for example, 1–5 parts by weight of the alkali solution to 1 part by weight of cellulose.

*Method 2.*—The parent material is mixed with 1–5 times its weight of strong alkali solution, for example caustic soda solution of 15–50 per cent strength, by hand or, preferably, in a suitable mixing apparatus.

Throughout the description and claims, wherever "alkali-cellulose" is mentioned, products in the sense of those obtainable according to Method 1 or 2 are implied.

*Method 3.*—The parent material is mixed with dilute alkali solution, for example caustic soda solution of 3–12 per cent strength; for example, either by mixing the parent material as such with the alkali solution or by previously producing its alkali compound (alkali-cellulose) according to Method 1 or 2 and then, according to the content of alkali already present, mixing either with water or alkali solution, so that the alkali may be present in the mixture in the desired proportion and concentration. The parent material may be mixed with alkali solution or the alkali cellulose with water or alkali solution manually or in a stirring, kneading or disintegrating apparatus. The final mixture may be so constituted that it contains from the outset an amount of alkali solution sufficient to dissolve the final product (xanthate) to the desired degree of viscosity, the said solution being of suitable concentration for this purpose (for example caustic soda solution of 4 to 15 per cent strength amounting to 8 to 24 times the weight of the air-dry parent material), or it may contain less or weaker or stronger alkali solution.

Wherever mention is made in the description or in the patent claims of mixture of cellulose with alkali solution or of cellulose being mixed with alkali solution, there are implied mixtures in the sense of those obtainable according to Method 3 as described in the foregoing paragraph.

The parent material charged with alkali according to Method 1, 2 or 3 is now, where necessary after several hours' or several days' standing (ripening), treated with carbon bisulphide and dissolved. If alkali cellulose produced according to Method 1 or 2 is subjected as such to the action of carbon bisulphide, sulphidizing and dissolving must occur in two separate operations, since the amount and concentration of the alkali solution are, as a rule unsuitable for the dissolution of the cellulose. If mixtures in the sense of Method 3 are used, sulphidizing and dissolving may then form one continuous operation, in certain circumstances even—practically speaking—one procedure.

In the treatment with carbon bisulphide and in dissolving, but particularly in dissolving, the basic principle of the present invention—the cold—is applied.

In this connection the following directions, to which, however, the invention is not to be confined, may be observed:

A. Sulphidizing and dissolving are conducted at temperatures below 0° C., for example between 0° and −25° C. or lower.

B. Sulphidizing is conducted partly at temperatures above 0° C., for example between 0° and +30° C. or higher and partly at temperatures below 0° C., preferably at temperatures between 0° and −25° C. or lower, while dissolving is conducted wholly at temperatures below 0° C., preferably at temperatures between 0° and −25° C. or lower. This procedure admits of two possibilities:—Sulphidizing is begun at temperatures above 0°, for example between 0° and +30° C. and is completed together with the dissolving at temperatures below 0° C., preferably at temperatures between 0° and −25° C. or lower; or sulphidizing is begun at temperatures above 0° C. for example between 0° and +30° C. or higher, is continued simultaneously with dissolving at temperatures below 0° C., preferably at temperatures between 0° and −25° C. or lower and is completed at temperatures above 0°, for example between 0° and +30° C. or higher.

C. Sulphidizing is conducted wholly at temperatures above 0° C., for example between 0° and +30° C. or higher and solution at temperatures below 0° C., for example at temperatures between 0° and −25° C. or lower.

Accordingly, the practical conduct of the process may be, for example, as follows:—

In a vessel or apparatus such as is commonly used for the purpose there is placed alkali cellulose (produced by treating the initial material according to Method 1), with carbon bisulphide which is allowed to act, preferably while shaking or stirring, for a short or prolonged period (for example from 5 minutes to 48 hours) either at +2° C. or lower, for instance between 0° and −5° C., or above 0° C., for instance at room temperature or higher, for example between +20° C. and +30° C. Then, according to the alkali-content of the alkali cellulose, there is added so much water or dilute alkali solution that in the mass there is present an amount of alkali solution sufficient and of the proper concentration for dissolving the final product (for example caustic soda solution of 4 to 12 per cent strength amounting to 8 to 24 times the weight of the air-dry parent material): the mass is then subjected, preferably while intermittently or continuously stirring, to the action of temperatures below 0° C., for example temperatures between 0° and −25° C. or lower, whereby the viscose solution is quickly formed.

Or, to a mixture of the parent material with alkali solution (prepared for example as per Method 3) contained in a vessel adapted to be closed, carbon bisulphide is added and allowed to act, preferably while shaking, stirring or agitating the mixture, for a short or prolonged period (for example from 5 minutes to 48 hours) either at +2° C. or lower, for example between 0° and −5° C. or above 0°, for example at room temperature. The mass is then subjected to the action of temperatures below 0° C., for example of temperatures between 0° and −25° C. or lower, and preferably while stirring, whereby the viscose solution is quickly produced. Its viscosity may be regulated by addition of alkali solution during the cooling action or subsequently.

All the foregoing methods, given by way of example, of carrying out the process have the common feature that dissolving occurs at low temperatures either during or after or before the treatment of the cellulose with carbon bisulphide in presence of alkali.

It is owing to this feature that the carrying out of the process is, practically speaking, subject to no restrictions or nearly so, in respect of temperature and duration of the action of carbon bisulphide, provided this action proceeds wholly or in part before solution, that is before the cooling action begins. Experience teaches that a wide latitude is allowable in this respect.

The temperature required to produce viscose solutions as perfect as possible depends partly on the strength of the alkali solution contained in the mixture, partly on the proportion of carbon bisulphide used and partly on the chemical and physical properties of the parent material.

As a general rule to be applied to temperature, it may be stated that the desired result, that is to say a perfect viscose solution, is obtained in every case at a temperature between −5° and −12° C., if not at a higher. This rule applies also to cases in which even higher temperatures, for example between 0° and −5° C. lead to the desired end.

At temperatures below −8° to −9° C., particularly if the alkali solution is very dilute (for example caustic soda solution of .6 per cent strength) and vigorous stirring is applied, the reaction masses usually show crystal formation or freeze. With the use of stronger alkali solutions (for example caustic soda solution of 10 to 12 per cent strength) the masses, certainly, do not freeze or crystallize quite so readily, but do so frequently at −9° to −12° C. if stirring is vigorous. This phenomenon in no wise impairs the quality of the final product. In very many cases it is even advisable to continue the cooling action up to the freezing or crystallizing stage and to keep the mass in this state for a short or prolonged period.

The formation of the viscose solution—effected in the cold—having been completed, the cooling action is eliminated and the cold solution raised to room temperature. The apparatus permitting, this may be done by substituting a gentle heating for the external or internal cooling, or by eliminating the cooling action and stirring the mass at room temperature or even by effecting the transition to room temperature quite gradually by suitable means.

Respecting the duration of the cooling action, it may be assumed as a guiding rule, to which, however, the invention is not intended to be confined, that the cooling operation may be ended immediately or shorly after a test portion shows that solution is complete and that a small test film quickly prepared (for example by spreading the solution on a glass plate and treating with a suitable precipitating bath, such as sulphuric acid of 10—20 per cent strength) exhibits the desired clarity and strength. Cooling may, however, be continued. But in many cases, for example in those where quite small proportions of carbon bisulphide are used, it is advisable not to prolong the period of cooling overmuch beyond the point at which complete dissolution has occurred, because in such cases the solution is liable to acquire a gelatinous character or to gelatinize completely or to turn muddy, owing to too prolonged cooling action.

It is advisable to stir or knead or to keep the mass in movement, intermittently or continously, during the cooling operation.

In the following examples the parts are by weight:—

*I.*

(a) 50 to 100 parts of air-dry, preferably finely crushed sulphite cellulose or bleached cotton, for example medicated cotton wool, are mixed with 900 to 1900 parts of caustic soda solution of 8 to 10 per cent strength at room temperature, preferably while stirring or kneading, until the mixture is homogenous. The period of mixing or stirring may be only 10 to 15 minutes, particularly when the parent material readily absorbs the caustic soda solution and is rapidly subdivided therein. The mixture may, however, be stirred for hours or allowed to stand, so as to obtain a uniform saturation of the parent material with the caustic soda solution. When the mixture is homogeneous, carbon bisulphide is added in the proportion of 30 to 50 parts to 100 parts of parent material; the vessel is closed and the mass stirred, kneaded, shaken or otherwise kept in motion for 10 to 15 minutes at room temperature. The mixture is then cooled—preferably in the same vessel, which is provided with an external or internal cooling device, or both, adapted to produce low temperatures (for example a cooling bath at about −16° to −25° C., into which the vessel is placed, or a cooled double jacket with or without cooled mixing wings, or a cooling coil or the like)—and during this operation the mass is stirred, kneaded, rubbed or agitated, the vessel being open or closed. Cooling is so conducted that the temperature of the mass cannot fall substantially below −10° to −11° C. At about −8° to −10° C. the mass begins to exhibit crystal formation or to freeze slightly, which phenomenon becomes more pronounced as the temperature continues to fall. As soon as the temperature of the mixture falls to −10° to −11° C. it is usually frozen to a soft, lard-like mass, the consistence of which, however, permits further stirring. After keeping the mass at −10° to −11° C. for 30–40 minutes, cooling is interrupted and the frozen solution thawed, preferably while still stirring, either at room temperature or, in order to accelerate the operation, with the application of gentle heat. At about −3° C. the mass becomes thawed to a solution, more or less viscous and fluid according to its cellulose content, which solution is milky, owing, no doubt, to the presence of unconsumed and very finely subdivided carbon bisulphide. The milky appearance vanishes, however, immediately, or soon after, the viscose solution is at room temperature. There is produced a viscose solution relatively little coloured and practically free from undissolved constituents, which during 14 days at room temperature shows no visible change, so that it may be described as stable for this period, at least. It may be worked up, without further treatment, into technical products; spread upon a glass plate and treated with dilute sulphuric acid (for example of 10–20 per cent strength) it yields a temporarily milky film, which becomes clear after long standing in the acid. After washing and drying the film is transparent and remarkably flexible.

(b) The mode of operation is exactly as in (a), except that to 100 parts of parent material only 20 to 25 parts of carbon bisulphide are used. The coloration after treatment with carbon bisulphide is scarcely appreciable. After thawing, the viscose solution is certainly milky, but not to the degree attained by that in Example I (a). Accordingly, the milky appearance vanishes somewhat more rapidly than in that case. There is produced a clear, scarcely coloured viscose solution, practically free from undissolved constituents, which, during 13 days at room temperature shows no visible indications of a change. Films produced therefrom are temporarily milky in the wet state, become perfectly clear after a prolonged period in the acid and are transparent and flexible in the dry state.

(c) The mode of operation is exactly as in (a), except that to 100 parts of parent material 10 to 15 parts of carbon bisulphide are used. There is no appreciable coloration after the carbon bisulphide treatment. After thawing, the product is a scarcely coloured viscose solution which is clear from the first and contains no undissolved constituents. A film made from it is, from the first, clear and strong in the dilute acid and flexible after washing and drying. During 14 days at room temperature, the solution shows no signs of a change.

(d) The mode of operation is exactly as in (a), except that only 5 to 6 parts of carbon bisulphide are used to 100 parts of parent material. There is no appreciable coloration after the carbon bisulphide treatment. The mixture is kept at −10° to −11° C. from 3 to 10 minutes only. The mass thaws to a viscose solution which is clear from the first, almost colourless and liquid and shows no visible change after 10 days at room temperature. It yields films which are transparent and flexible both in the wet and in the dry state.

In the foregoing examples there may be used also a weaker solution of caustic soda, for instance such of 6 per cent strength. The duration of the action of carbon bisulphide may be prolonged for example up to 12 hours. The time of the action of low temperatures (−10° to −11° C.) may be shortened to 1 to 3 minutes.

Instead of wood pulp or cotton there may be employed a cellulose hydrated by mechanical or physical means for example according to the following formulas:

(1) 200 parts of sulphite cellulose in fleece- or sheet-form are stirred with 10 to 20 times their weight of water until the mixture is homogeneous and after standing for several hours or several days at room temperature the mixture is reduced to 250 to 350 parts by weight by pressing or centrifuging. The compressed cake or residue is then ground or crushed for several hours up to eight days in a suitable apparatus (for example, a disintegrator, shredder, beater, willowing machine, devil or kneading apparatus) and optionally dried.

(2) 100 parts of sulphite cellulose in fleece- or sheet-form or medicated cotton wool are saturated with 900 to 1000 part of a caustic soda solution of 18 to 30 per cent strength at room temperature and left in this solution for 6–24 hours; the whole is then reduced to 200 to 300 parts by weight by pressing or centrifuging and comminuted or disintegrated in a suitable apparatus (for example a disintegrator, shredder, beater, willowing machine or devil). The soda-cellulose, either immediately after disintegration or after standing for 1–3 days at room temperature, is then stirred with cold or hot water, washed, pressed or centrifuged and dried in a vacuum or in the air, or used in the pressed or centrifuged state, in which case the proportion and strength of the caustic soda solution to be added must be adapted to the water-content. After washing, the mercerized cellulose may still be treated with a dilute acid (for example sulphuric acid of 10 per cent strength) and again washed, centrifuged or pressed and, if desired, dried.

II.

(a) 100 parts of mercerized cellulose as in Example I (2), or 100 parts of medicated cotton wool, or 100 parts of sulphite cellulose or a quantity of the parent material as described in Example I (1) corresponding with 100 parts by weight of air-dry sulphite cellulose are mixed with 1200 to 1900 parts of caustic soda solution of 8 per cent strength until the whole is homogeneous. 40 parts of carbon bisulphide are then added, the vessel is closed and the mixture quickly brought to −1° C. and kept at this temperature for 6 hours, while periodically stirring, shaking or the like. After this period, no solution is formed, but a light yellow, fibrous paste, which, spread upon a glass plate and treated with dilute sulphuric acid yields no film, but an opaque, decomposing residue. The mass is then cooled to −10° to −11° C. and kept at this temperature for about 1–2 minutes. The very slightly crystallized or frozen mass is brought to room temperature, when it becomes a clear, fluid solution of viscose of the colour of white wine and practically free from undissolved constituents. The solution yields a temporary milky film, which after a considerable period in the acid becomes perfectly clear and strong and after washing and drying is transparent and flexible. During 10 days at room temperature no change is visible in the solution.

(b) The mode of operation is as in (a), except that only 8 parts of carbon bisulphide are used and that the 6-hours' sulphidizing operation is effected at 0° C. In this case also, no solution occurs and the mass yields no film. The viscose solution obtained differs from that obtained in (a) only in being of a lighter colour. In all other respects, the behaviour of the solution and of the films is as in (a).

III.

(a) 100 parts of mercerized cellulose as in Example I (2), or 100 parts of medicated cotton wool, or 100 parts of sulphite cellulose or a quantity of the parent material as described in Example I (1) corresponding with 100 parts by weight of air-dry sulphite cellulose are mixed with 1200 to 1900 parts of caustic soda solution of 10 per cent strength until the mixture is homogeneous. 40 parts of carbon bisulphide are added and the whole is treated therewith for 2 hours at room temperature, whereby a scarcely appreciable coloration occurs. This mixture is then brought, while stirring, to −5° C. and kept at this temperature for 5–10 minutes. The slightly milky, complete solution becomes perfectly clear when brought to room temperature. There is formed a fluid, clear solution of viscose of a white wine colour, practically free from undissolved constituents. The solution yields a film which turns temporarily hazy in dilute sulphuric acid, but then becomes clear and after washing and drying is transparent and flexible.

(b) The mode of operation is exactly as in (a), except that only 5–10 parts of carbon bisulphide are used. The product is a clear viscose solution, which yields a transparent and flexible film. During 10 days at room temperature there is no visible change in the solution.

IV.

100 parts of sulphite cellulose or medicated cotton wool or a quantity of the parent material as described in Example I (1) corresponding with 100 parts by weight of air-dry sulphite cellulose are mixed with 1900 to 2400 parts of caustic soda solution of 8–10 per cent strength until the mixture is homogeneous, 20 parts of carbon bisulphide are added and the whole is stirred or shaken or the like for 3 hours at room temperature. After this period no solution is formed, but a slightly coloured fibrous mixture. A part of the mass is separated from the bulk, and kept at room temperature for 10 hours. Even after this period no solution is formed, but only a swollen fibrous paste which, spread upon a glass plate and treated with dilute sulphuric acid, yields no clear film but an opaque film held together by felted fibres. At the end of the 3 hours, the bulk of the mass is brought to 0° C. and kept at this temperature for 3 hours. There is produced, certainly, a fibrous solution, but it yields a film permeated with fibres and only partly transparent. The mass is now cooled to −11° C. and kept at this temperature for 1–3 minutes, whereby it solidifies to a form resembling thin lard. After it has been thawed it is a perfectly clear, scarcely coloured viscose solution, practically free from undissolved constituents, which yields a perfectly transparent and flexible film. During 10 days at room temperature no change is visible in the solution.

*V.*

(a) 200 parts of soda-cellulose produced by impregnating 100 parts of sulphite cellulose with 1000 parts of caustic soda solution of 18 per cent strength, allowing it to stand for 6–24 hours at room temperature, pressing until the whole weighs 200 parts, disintegrating, and, if desired, ripening for 1–3 days, are mixed with 3 to 5 parts of carbon bisulphide and the whole is stirred or shaken or otherwise agitated for 6–12 hours in a closed vessel at room temperature. 1500 to 1800 parts of caustic soda solution of 8 per cent strength are then added, the mass is thoroughly stirred for about 10–20 minutes and cooled, while stirring, to −10° to −11° C., whereby it freezes slightly. After being kept at this temperature for about 2 to 4 minutes, the product is thawed. There is produced a practically colourless viscose solution substantially free from undissolved constituents, which yields a film clear and resistant to tensile strain in the wet state, transparent and flexible in the dry state. During 14 days at room temperature no signs of a change are visible in the solution.

(b) 200 parts of soda-cellulose, as described in (a), are mixed with 6–7 parts by weight of carbon bisulphide and stirred or shaken for 6 hours at room temperature, whereby a very slight coloration tending to light-yellow occurs. 1800 parts of caustic soda solution of 6 per cent strength are then added and the mass is thoroughly stirred, thus producing a solution, but one which contains fibres. It yields a slightly hazy film containing fibres. It is then cooled to −10° to −11° C. and kept at this temperature for half an hour, whereby it crystallizes or freezes to a mass that can be stirred. After thawing, it is a clear, scarcely coloured solution practically free from undissolved constituents, which yields a transparent, flexible film. After 14 days no indications of a change are visible in the solution.

(c) 200 parts of soda-cellulose as in (a) are mixed with 10–20 parts by weight of carbon bisulphide and treated therewith at room temperature for 20 minutes to 3 hours, while a scarcely appreciable coloration occurs. 800 to 1200 parts by weight of caustic soda solution of 6 to 8 per cent strength are then added; no solution occurs. The mass is then cooled to −10° to −11° C. and kept at this temperature for half an hour, while stirring. After thawing, the product is a scarcely coloured, fluid viscose solution, practically free from undissolved constitutents, which yields a transparent, flexible film. During 14 days no signs of a change are visible in the solution.

*VI.*

Any known process of manufacturing viscose is conducted to the end of the sulphidizing stage, the sulphidized mass being then dissolved in water or caustic soda solution at −5° C. or −10° to −11° C., according to the foregoing examples.

All the viscose solutions obtained by following the foregoing examples, even those produced with very small proportions of carbon bisulphide, show the characteristic metallic reactions of viscose, for example the distinctive red coloration with a solution of a nickel salt.

In the following claims the expression "cellulose in presence of alkali" is used not only to designate alkali cellulose in the usual meaning, that is to say the products obtainable according to the hereinbefore Method 1 or 2, but also to designate mixtures of cellulose with alkali solution which are obtained according to Method 3.

In the following claims the expression "preparation of viscose" embraces all the proceedings from the addition of carbon bisulphide to the production of the viscose solution ready for use.

Also, the term "sulphidizing" signifies: Treatment of cellulose with carbon bisulphide in presence of alkali.

The term "freezing" signifies commencing, advanced or complete separation of crystals or freezing.

I claim:

1. Process for making viscose, which process comprises employing at least temporarily temperatures below 0° C. at any stage of the process between the addition of the $CS_2$ and the end of the dissolving step.

2. Process for making viscose, which process comprises sulphidizing the cellulose at least partially at temperatures between minus 5° C. and plus 30° C. and dissolving the sulphidized cellulose at temperatures below 0° C.

3. Process for making viscose, which process comprises causing the cellulose after being treated with carbon bisulphide in presence of alkali to dissolve at temperatures below 0° C.

4. Process for making viscose, which process comprises causing the cellulose during its treatment with carbon bisulphide in presence of alkali to dissolve at temperatures below 0° C.

5. Process for making viscose, which process comprises treating the cellulose with carbon bisulphide in presence of alkali for 5 minutes to 48 hours, and then subjecting it to a temperature below 0° C., in the presence of an alkali solution of a sufficient concentration and in a sufficient proportion, to dissolve the final product.

6. Process for making viscose, which process comprises treating a mixture of cellulose and an aqueous alkali solution with carbon bisulphide and subsequently subjecting the whole to the action of temperatures below 0° C.

7. Process for making viscose, which process comprises treating a mixture of cellulose and a caustic soda solution of not more than 15 per cent strength with carbon bisulphide and thereafter subjecting the whole to the action of temperatures below 0° C.

8. Process for making viscose, which process comprises treating cellulose in presence of caustic soda solution of 4 to 15 per cent strength amounting to 8 to 24 times the weight of the air-dry cellulose with carbon bisulphide and thereafter subjecting the whole to the action of temperatures below 0° C.

9. Process for making viscose, which process comprises treating alkali cellulose with carbon bisulphide, then adding water or aqueous alkali solution to the product thereby obtained and subjecting it to the action of temperatures below 0° C.

10. Process for making viscose, which process comprises subjecting cellulose after being treated in the presence of alkali with a proportion of carbon bisulphide which does not exceed one-sixth molecular proportion of carbon bisulphide to one molecular proportion of $C_6H_{10}O_5$ to the action of temperatures below 0° C.

11. Process for making viscose, which process comprises subjecting cellulose during its treatment in presence of alkali with a proportion of carbon bisulphide which does not exceed one-sixth molecular proportion of carbon bisulphide to one molecular proportion of $C_6H_{10}O_5$ to the action of temperatures below 0° C.

12. Process for making viscose, which process comprises employing at least temporarily, after the addition of carbon bisulfide, temperatures below 0° C. in the course of the preparation of viscose, and prolonging the cooling treatment to freezing.

13. Process for making viscose, which process comprises preparing the viscose from mercerized cellulose made by treating cellulose with alkali solution and washing with water and employing at least temporarily temperatures below 0° C. during some stage of the operations, after the addition of $CS_2$.

14. Process for making viscose, which process comprises preparing the viscose from cellulose which has been ground in presence of water and employing at least temporarily temperatures below 0° C. after the addition of the carbon bisulphide.

15. As a new product, a viscose which in its fresh crude state contains more than six molecular proportions of cellulose $C_6H_{10}O_5$ per one molecular proportion of $CS_2$.

16. As a new product, a viscose which in its fresh crude state contains more than ten molecular proportions of cellulose $C_6H_{10}O_5$ per one molecular proportion of $CS_2$.

17. As a new product, a viscose which in its fresh crude state contains not less than seven and not more than forty molecular proportions of cellulose $C_6H_{10}O_5$ per one molecular proportion $CS_2$, and which shows red coloration with a solution of a nickel salt.

18. The herein described process which comprises (a) treating cellulose with a caustic alkali solution (b) treating with carbon bisulfide and (c) dissolving the product, the temperature at some stage after the beginning of the second step being below 0° C.

19. The herein described process which comprises (a) treating cellulose with a caustic alkali solution (b) treating with carbon bisulfide and (c) dissolving the product, the temperature at some stage after the beginning of the second step being low enough to convert the reaction mixture into a mass of soft lard-like consistency.

20. A process of making viscose solution which comprises mixing a cellulosic material, caustic alkali, water and carbon bisulfide, in such proportions as to convert substantially all the cellulose into viscose, and subjecting the product to a temperature below 0° C., whereby solution of the viscose is effected.

21. A process of making viscose solution which comprises mixing a cellulosic material, caustic alkali, water and carbon bisulfide, in such proportions as to convert substantially all the cellulose into viscose, the carbon bisulfide being used in amount not substantially over 5% of the amount of the cellulose, and subjecting the product to a temperature below 0° C., whereby solution of the viscose is effected.

22. A process of making viscose solution which comprises mixing a cellulosic material, caustic alkali, water and carbon bisulfide, in such proportions as to convert substantially all the cellulose into viscose, the carbon bisulfide being used in amount not substantially over 4% of the amount of the cellulose, and subjecting the product to a temperature below 0° C., whereby solution of the viscose is effected.

In testimony whereof I affix my signature.

LEON LILIENFELD

CERTIFICATE OF CORRECTION.

Patent No. 1,658,607. Granted February 7, 1928, to

LEON LILIENFELD.

It is hereby certified that error appears in the printed specification of the above numbered patent requiring correction as follows: Page 6, line 6, for "part" read parts, and line 39, for "bisulphite" read bisulphide; and that the said Letters Patent should be read with these corrections therein that the same may conform to the record of the case in the Patent Office.

Signed and sealed this 29th day of September, A. D. 1931.

(Seal)

M. J. Moore,
Acting Commissioner of Patents.